(12) United States Patent
Dugas et al.

(10) Patent No.: US 7,800,862 B1
(45) Date of Patent: Sep. 21, 2010

(54) MAGNETIC RECORDING HEAD HAVING SECONDARY SUB-GAPS

(75) Inventors: Matthew P. Dugas, St. Paul, MN (US); Gregory L. Wagner, Arden Hills, MN (US); Marlow L. Roberts, Champlin, MN (US)

(73) Assignee: Advanced Research Corporation, White Bear Lake, MN (US)

( * ) Notice: Subject to any disclaimer, the term of this patent is extended or adjusted under 35 U.S.C. 154(b) by 407 days.

(21) Appl. No.: 11/061,253

(22) Filed: Feb. 18, 2005

Related U.S. Application Data (60) Provisional application No. 60/545,423, filed on Feb. 18, 2004.

(51) Int. Cl.
 *G11B 5/265* (2006.01)
 *G11B 5/29* (2006.01)
 *G11B 5/31* (2006.01)
(52) U.S. Cl. .............. 360/119.06; 360/121; 360/125.35
(58) Field of Classification Search ............ 360/119.06, 360/119.07, 121, 122, 125.34, 125.35, 125.36, 360/125.37
 See application file for complete search history.

(56) References Cited

U.S. PATENT DOCUMENTS

| | | | | |
|---|---|---|---|---|
| 4,837,924 A | * | 6/1989 | Lazzari | 360/125 |
| 4,992,897 A | * | 2/1991 | Deroux-Dauphin | 360/126 |
| 5,090,111 A | * | 2/1992 | Lazzari | 360/119 |
| 5,195,006 A | * | 3/1993 | Morikawa | 360/126 |
| 5,224,260 A | * | 7/1993 | Fedeli et al. | 360/127 |
| 5,572,392 A | * | 11/1996 | Aboaf et al. | 360/126 |
| 5,689,384 A | | 11/1997 | Albrecht et al. | |
| 5,742,452 A | * | 4/1998 | Simmons et al. | 360/126 |
| 5,793,577 A | * | 8/1998 | Katz et al. | 360/126 |
| 6,269,533 B2 | | 8/2001 | Dugas | |
| 6,496,328 B1 | | 12/2002 | Dugas | |

* cited by examiner

*Primary Examiner*—Craig A. Renner
(74) *Attorney, Agent, or Firm*—Dorsey & Whitney LLP; Nathan J. Witzany, Esq.

(57) ABSTRACT

A magnetic head and method for making same which can be used for formatting or writing servo tracks or data on a tape. In one example, the magnetic head may include a magnetic thin film layer; at least one gap defined in the magnetic thin film layer; and at least one secondary sub-gap structure within the magnetic thin film layer, the at least one gap positioned proximate the at least one secondary sub-gap structure. Through the use of the secondary sub-gap structure, the gap (i.e. a record gap or channel) can be made thinner than in conventional heads.

14 Claims, 7 Drawing Sheets

Fig. 1

Prior Art

MAGNETIC RECORDING HEAD HAVING SECONDARY SUB-GAPS

CROSS REFERENCE TO RELATED APPLICATION

This application claims the benefit under 35 U.S.C. §119 (e) of U.S. Provisional Patent Application No. 60/545,423 entitled "Dual Sub-Gap Head" filed on Feb. 18, 2004, the disclosure of which is hereby incorporated by reference in its entirety.

TECHNICAL FIELD

The present invention relates generally to magnetic recording heads, such as those made of thin-film materials and ceramic materials. In particular, the present invention relates to methods and apparatuses used in writing servo tracks onto a tape surface during production of tape.

BACKGROUND

Magnetic tape as a data storage medium requires the ability to effectively write and read data to data tracks of the magnetic tape. Many such data tracks typically extend linearly along the length tape and, in part, define tape density. In addition, for providing a controlled movement of tape reading and/or writing heads with respect to the data tape, servo tracks are commonly used which also extend linearly along the length of tape. Servo tracks are typically written in such a way as to span the tape in an efficient manner that maximizes the number of data tracks and minimizes the number of servo tracks for a given tape system. Data reading and writing heads thus typically also include one or more servo read heads. Servo read heads may either be specifically dedicated servo reads heads or they may be data read heads that are operating as servo read heads at a particular track position.

Figure 1:
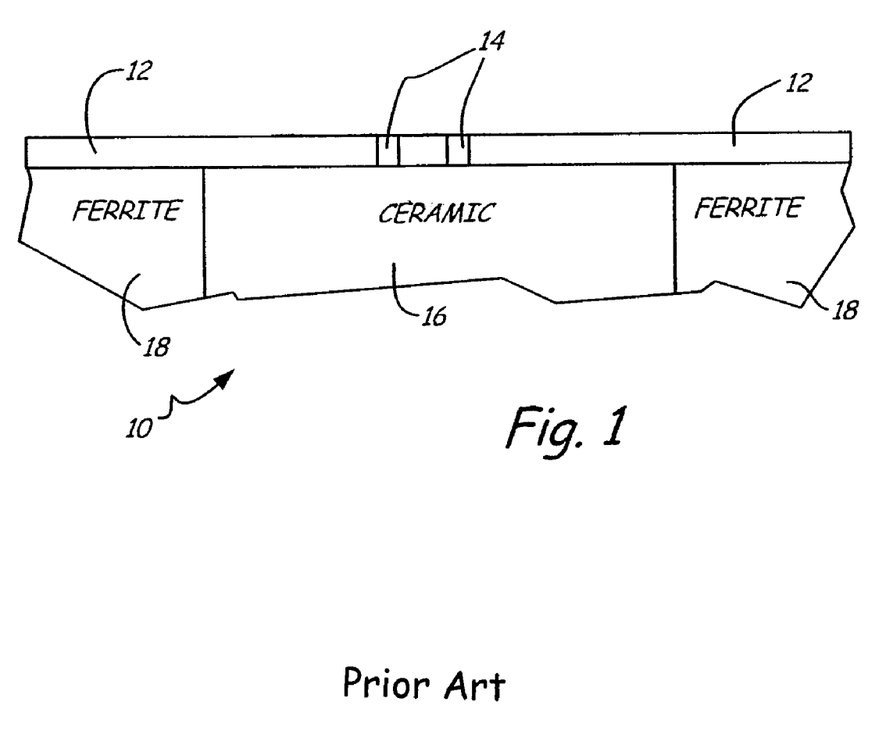
FIG. 1 illustrates a sectional view of a conventional magnetic recording head.

FIG. 1 illustrates a sectional view of an example of a conventional prior art head 10. A magnetic thin film layer 12 (such as approximately 2 to 3 microns in thickness) is provided having a pair of gaps 14 therein that define a recording feature or channel. Typically, the gaps 14 have a width of approximately 1.5 to 2.0 microns and a height of approximately 2.5 to 3.0 microns. Below the pair of gaps, a primary ceramic sub-gap 16 is provided by the ceramic material between the ferrite portions or poles 18 of the head. The head 10 may be a Type I™ head having a single ferrite channel, such as described in U.S. Pat. No. 5,689,384; or a Type II™ head having multiple ferrite channels such as described in U.S. Pat. No. 6,496,328, the disclosures of which are both incorporated by reference in their entirety.

As recognized by the present inventors, in order to make higher linear density servo patterns in a head, such as in a Type I™ or Type II™ head design or other designs, there needs to be a narrower record gap 14 in the magnetic thin film layer 12 for certain applications. The gap length is typically 1.4 microns at the head-to-media interface with a 2.5 to 2.7 micron magnetic thin film thickness. This approximately 2:1 aspect ratio is typical for certain head fabrication techniques. The 2.5 to 3.0 micron film thickness can provide efficient flux conduction to the gap region.

Accordingly, as recognized by the present inventors, what is needed is a head having a narrower record gap and a method of making such a head. It is against this background that various embodiments of the present invention were developed.

SUMMARY

In light of the above and according to one broad aspect of an embodiment of the invention, disclosed herein is a magnetic head which can be used for formatting or writing servo tracks or data on a tape. In one example, the magnetic head may include a magnetic thin film layer or structure; at least one gap defined in the magnetic thin film layer; and at least one secondary sub-gap structure (which may be non-magnetic) within the magnetic thin film layer, the at least one gap positioned proximate the at least one secondary sub-gap structure. Through the use of the secondary sub-gap structure, the gap (i.e. a record gap or channel in the surface of the head) can be made thinner than in conventional heads.

In one example, the at least one secondary gap structure is made of material including SiO2 or Al2O3. There are various examples of dimensions and thicknesses disclosed herein, for example, the magnetic thin film layer may be approximately 3 microns thick in one example, and the at least one gap may be between approximately 0.125 to 0.25 microns wide.

In one embodiment, the at least one secondary gap structure may include a pair of angled side walls and a top surface, and the at least one gap may be positioned on the top surface of the at least one secondary gap structure.

According to another broad aspect of another embodiment of the present invention, disclosed herein a magnetic media formatted by a magnetic head, the magnetic head comprising a magnetic thin film layer, at least one gap defined in the magnetic thin film layer, and at least one secondary sub-gap structure within the magnetic thin film layer.

According to another broad aspect of another embodiment of the present invention, disclosed herein is a magnetic tape manufactured by a method comprising writing servo information onto the magnetic tape using a servo head. In one example, the servo head may include a magnetic thin film layer, at least one gap defined in the magnetic thin film layer, and at least one secondary sub-gap structure within the magnetic thin film layer, the at least one gap positioned proximate the at least one secondary sub-gap structure.

According to another broad aspect of another embodiment of the present invention, disclosed herein is a method for forming a magnetic head having a magnetic thin film layer. In one example, the method may include forming a structure surrounded by the magnetic thin film layer; and forming a gap in the magnetic thin film layer, the gap positioned atop the structure. In one embodiment, the operation of forming a structure within the magnetic thin film layer may include depositing SiO2 material and shaping the SiO2 material, or depositing Al2O3 material and shaping the Al2O3 material, as an example.

The foregoing and other features, utilities and advantages of the invention will be apparent from the following more particular description of various embodiments of the invention as illustrated in the accompanying drawings and claims.

DETAILED DESCRIPTION

Disclosed herein is a magnetic head structure for use with a tape medium, and method for making such a magnetic head. The magnetic head may be a write head or a read head, for instance used to write servo patterns or other data on a magnetic tape medium. Generally, embodiments of the invention provide for forming small record gaps on the surface of such heads. Various embodiments of the invention will now be described.

Figure 2:
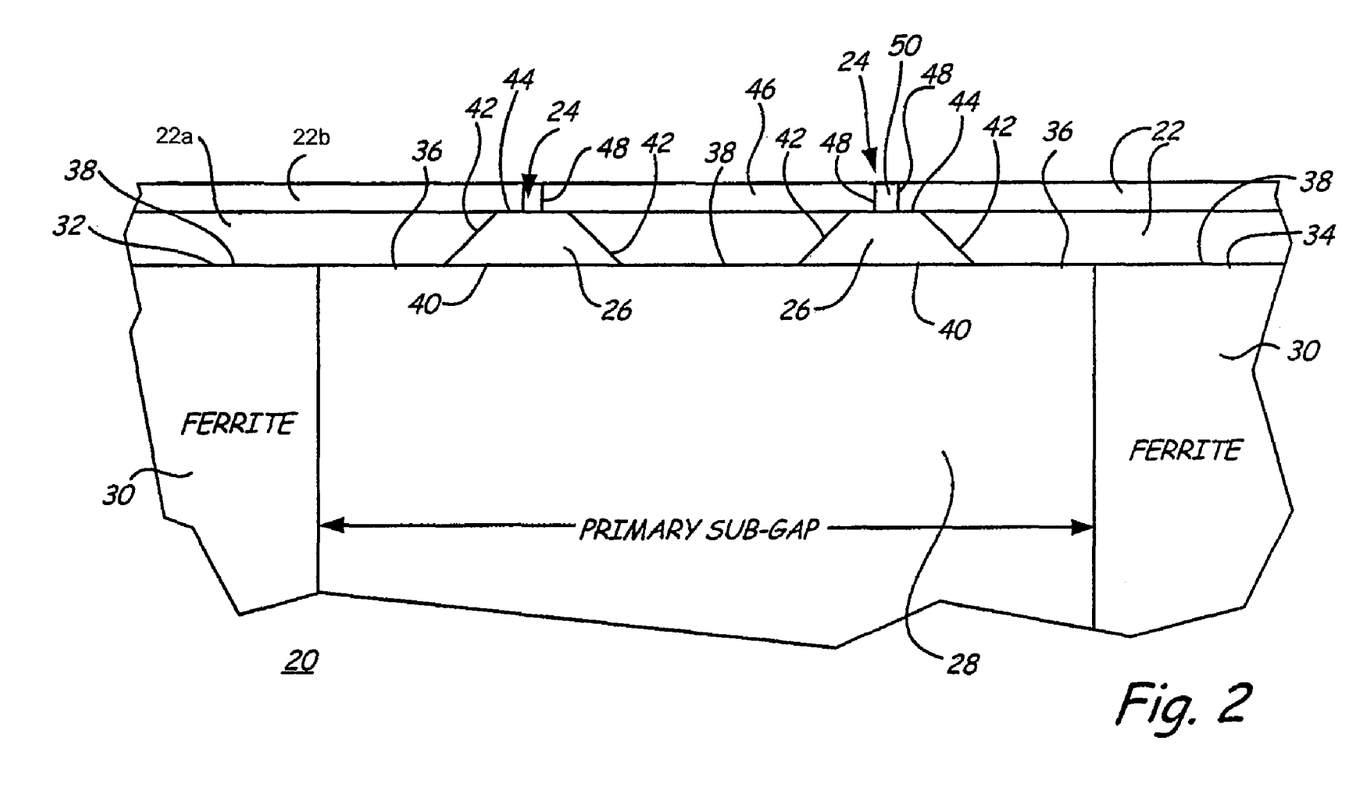
FIG. 2 illustrates a sectional view of a magnetic recording head having a primary sub-gap and a secondary sub-gap, in accordance with one embodiment of the present invention.

FIG. 2 illustrates a sectional view of one example of a head 20, in accordance with one embodiment of the present invention. In one example, a head 20 may include a magnetic thin film layer or structure 22 (22a and 22b) having one or more gaps 24 (also referred to herein as record gaps, channels, or arbitrary gap features) therein, the one or more gaps 24 positioned upon or proximate to one or more secondary sub-gap structures 26, also within the magnetic thin film layer 22 and located on a primary sub-gap surface 28. Through the use of secondary sub-gap structures 26, the record gaps 24 can be made much more narrower than conventional surface file recording heads and still maintain the same reluctance of the total magnetic path length of conventional surface film head designs.

As shown in FIG. 2, the head 20 includes two sub-poles 30, shown made of ferrite in this embodiment, which border a primary sub-gap region 28. While in this example, the first and second poles 30 are made of ferrite, the sub-poles 30 may also be made of thin film materials such as NiFe or other similar soft magnetic materials. The primary sub-gap region 28 may be made of bulk ceramic materials or thick thin film non-magnetic materials and may have differing dimensions depending on the particular implementation. As an example only, the primary sub-gap region 28 may have a width of approximately 10 to 300 microns between the sub-pole regions 30 of the head 20.

In one embodiment, the top surfaces 32, 34, 36 of the first and second ferrite regions 30 and the primary sub-gap region 28 form an upper surface or plane 38. Upon the upper surface 38, a magnetic thin film layer 22a is provided having one or more secondary sub-gap structures 26 defined therein, each secondary sub-gap structure 26 having a record gap 24 associated therewith and defined in the magnetic thin film material 22b. The secondary sub-gap structures may be non-magnetic.

In the example of FIG. 2, a secondary sub-gap structure 26 may include a bottom surface 40, a pair of sidewalls 42, typically with a slight angle, and a top surface 44 defining a plane. In one example, the bottom surface 40 of the secondary sub-gap 26 is wider than the top surface 44 of the secondary sub-gap, thereby retaining the thick and efficient flux conduction for the majority of the magnetic thin film while focusing the flux to the recording gaps 24 which are defined in the smaller thinner magnetic layer 22b of the magnetic layer 22. The thinner magnetic layer 22b will have a thickness that can define the height of recording gaps 24. In this way, the recording gaps 24 may be made much smaller in width by application of the aspect ratio rules of a particular gap definition.

The top surface 44 of the secondary sub-gap structure 26 defines a mesa, shelf, plateau or plane (these terms are used interchangeably) upon which the record gap 24 of the head 20 can be defined. The record gap 24 is positioned on the shelf 44 of the secondary sub-gap 26, the record gap 24 having generally parallel walls 48 defining an opening or cavity 50 between portions of the magnetic thin film layer 22. Preferably, the record gap 24 defines an empty cavity without any material within the gap 24. The record gap 24 may define the recording pattern or recording feature of a recording head. The stray field flux of the gap 24 records onto the tape medium.

In one example, a secondary sub-gap structure 26 may be formed by depositing materials upon the upper surface 38 of a conventional head substrate during manufacturing. For instance, materials such as SiO2, Al2O3 or other materials (including non-magnetic materials) may be deposited along the upper surface 38 of the head 20 proximate the surface 36 of the primary sub-gap 28 to form one or more secondary sub-gap structures 26. During the deposition process, the shape of the secondary sub-gap structure 26 may be defined depending on the particular implementation. It is understood that the cross-sectional shape of a secondary sub-gap structure 26 as shown in FIG. 2 is provided by way of example only, and the secondary sub-gap structure 26 may have other shapes, such as non-angled side walls 42, if desired.

In one example, the width of the shelf 44 of a secondary sub-gap structure 26 may be approximately two to three microns, while the bottom surface or base 40 of the secondary sub-gap structure 26 may be approximately 6 to 7 microns in width, depending upon the particular implementation. In one example, the height of the secondary sub-gap structure 26 is approximately 2.5 microns, while the width of the record gap 24 is approximately 0.25 microns in the thinner magnetic layer 46. In another example, the record gap 24 may be approximately 0.1 to 0.25 microns wide, although larger record gaps 24 can be formed if desired. It is understood that other dimensions may be realized using embodiments of the present invention.

For instance, the record gap 24 and the thinner magnetic layer 46 can be between approximately 0.1 to 0.5 microns in height (in contrast with some conventional gaps which are approximately 2.0 to 3.0 microns in height) and hence, using processing techniques having a 2:1 or 3:1 aspect ratio, a gap width of about 0.1 microns to 0.25 microns may be achieved. Other processing techniques and technologies may be employed.

Figure 3:
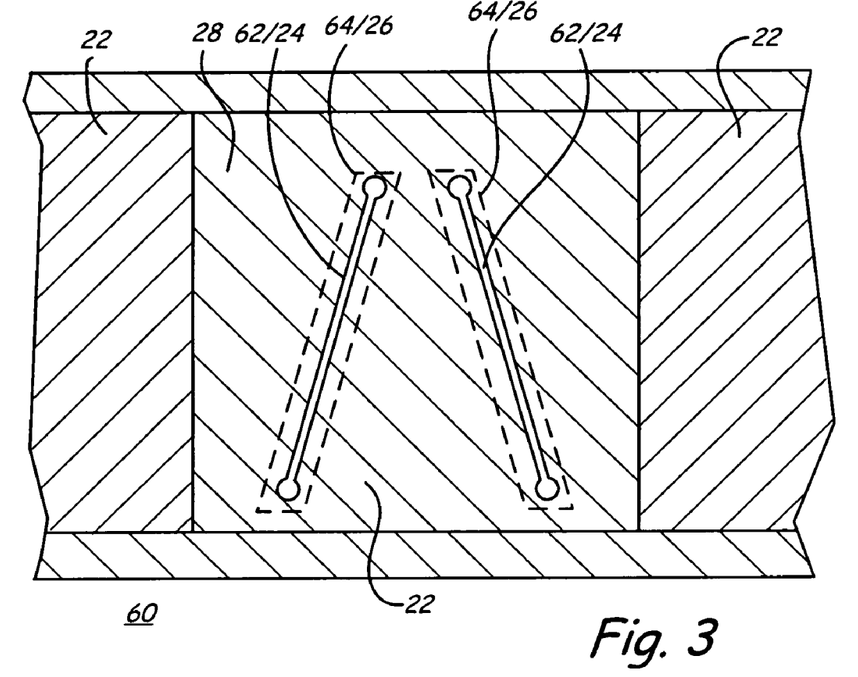
FIG. 3 illustrates a top view of an example of a head incorporating a primary sub-gap and a secondary sub-gap, in accordance with one embodiment of the present invention.
Figure 4:
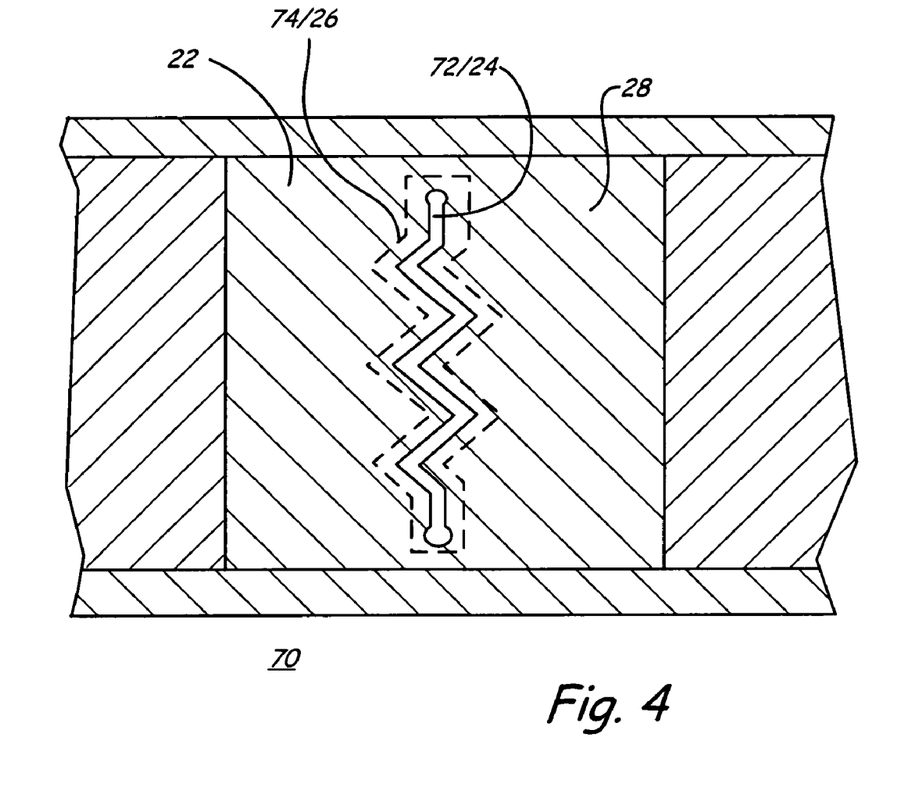
FIG. 4 illustrates a top view of another example of a head incorporating a primary sub-gap and a secondary sub-gap, in accordance with one embodiment of the present invention.
Figure 5:
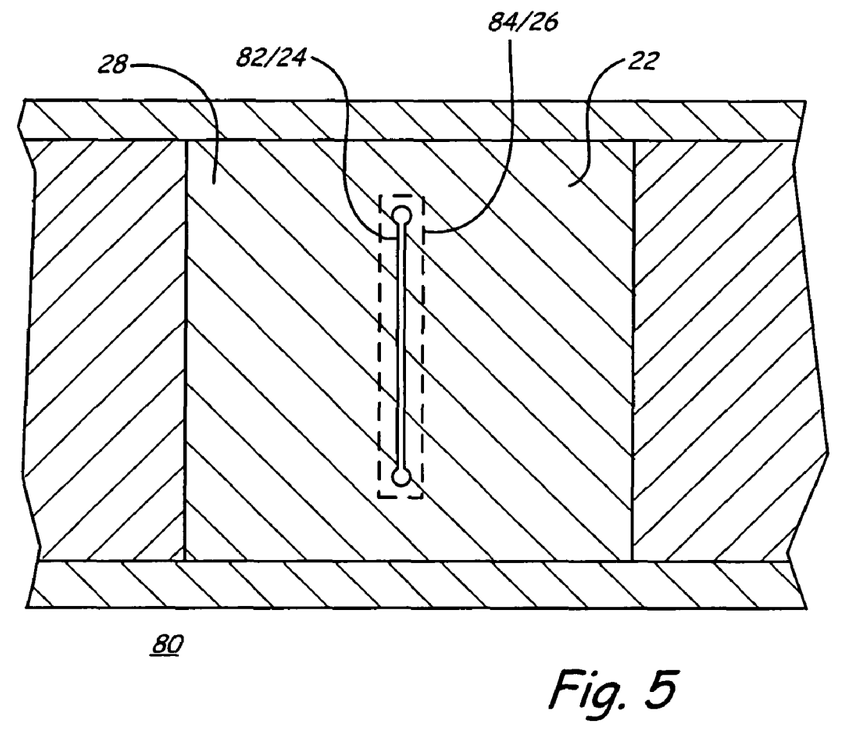
FIG. 5 illustrates a top view of another example of a head incorporating a primary sub-gap and a secondary sub-gap, in accordance with one embodiment of the present invention.
Figure 6:
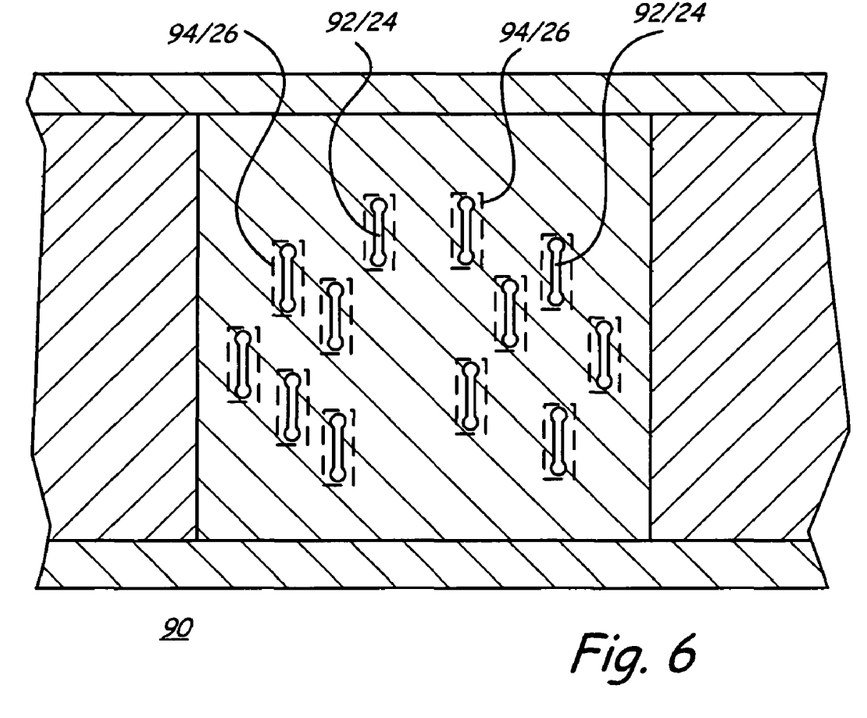
FIG. 6 illustrates a top view of another example of a head incorporating a primary sub-gap and a secondary sub-gap, in accordance with one embodiment of the present invention.

One or more aspects of the present invention can be implemented in different heads (such as write heads, servo write heads, or read heads) having various different channel/arbitrary gaps patterns, including complex gap patterns. FIGS. 3-6 illustrate a few such examples. FIG. 3 illustrates an example of a top view of a head 60 having a pair of angled record gaps 62/24, wherein the record gaps 62/24 have a secondary sub-gap 64/26 shown via the dotted lines. FIG. 4 illustrates another example of a record head 70, wherein the record gap feature 72/24 is generally a 45 degree zigzag shape, such as for use in an azimuthal servo-write channel, wherein the record gap 72/24 has a secondary sub-gap 74/26 shown via the dotted lines, in accordance with one embodiment of the present invention. FIG. 5 illustrates another example of a top view of a simple erase or amplitude write channel 82/24 of a record head 80, wherein the record gap 82/24 has a secondary sub-gap 84/26 shown via the dotted lines, in accordance with one embodiment of the present invention. FIG. 6 illustrates another example of a top view of a head 90, having a plurality of recording gaps 92/24 distributed for use as a stepped time base servo head, wherein the record gaps 92/24 have a secondary sub-gap 94/26 shown via the dotted lines.

It is understood that the examples of FIGS. 3-6 are provided as examples only, and that one or more features of embodiments of the present invention may be incorporated into different heads having different channel designs.

Figure 7:
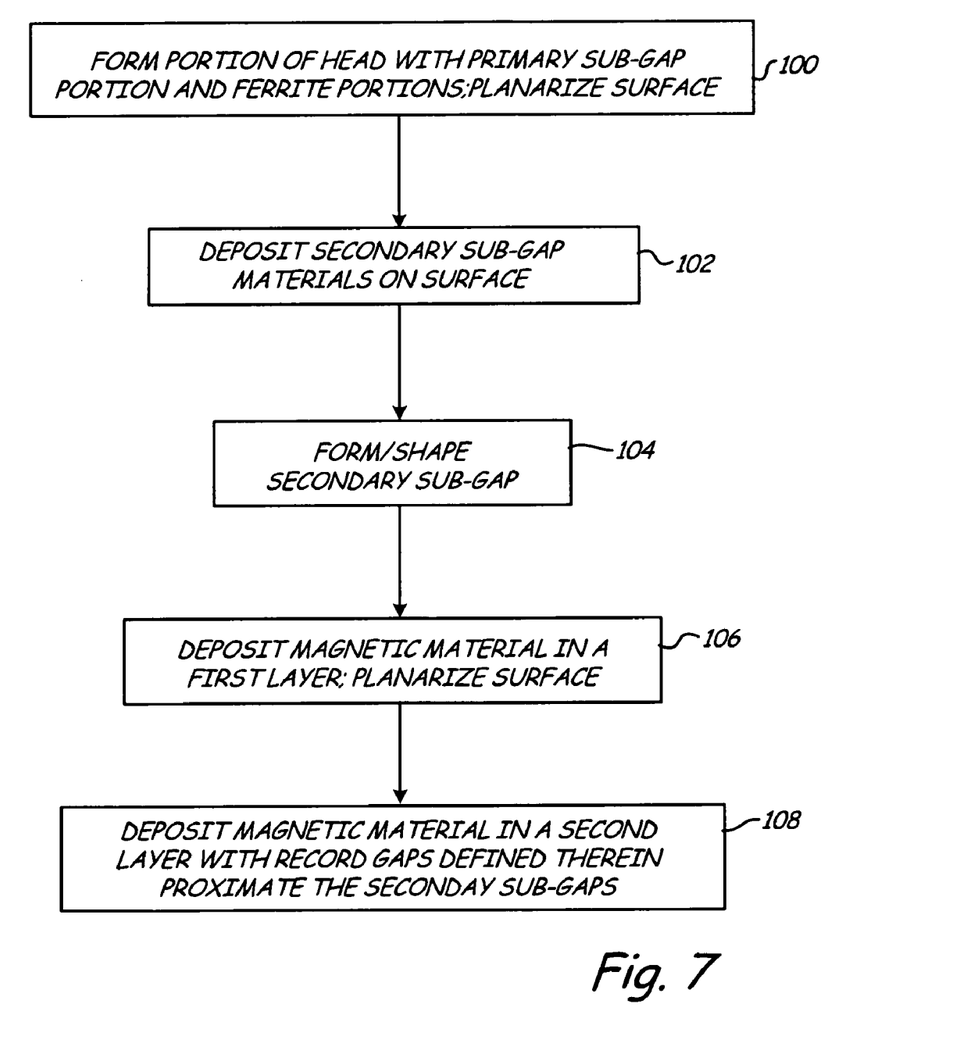
FIG. 7 illustrates an example of operations for forming a head having a secondary sub-gap, in accordance with one embodiment of the present invention.

FIG. 7 illustrates an example of operations for forming a head having a secondary sub-gap structure, in accordance with one embodiment of the present invention. In one embodiment, a method for forming a magnetic head having a magnetic thin film layer includes forming a structure, preferably non-magnetic, surrounded by the magnetic thin film layer, and forming a gap in the magnetic thin film layer, the gap positioned atop the structure.

In one example and as shown in FIG. 7, at operation 100 a portion of the head is formed with a two or more ferrite portions and a primary sub-gap formed therebetween of a conventional material such as ceramic. For instance, operation 100 may result in a ferrite-ceramic-ferrite structure, and the surface of the ferrite-ceramic-ferrite structure may be planarized or contoured as desired.

At operation 102, a material for forming a secondary sub-gap structure is deposited on the structure of operation 100, preferably on the surface of the ceramic primary sub-gap of the structure. The deposited material may be SiO2, AlO3, or other non-magnetic materials. The deposition of this material may be by sputtering or other well-known deposition processes.

At operation 104, the secondary-sub gap material deposited by operation 102 is processed. Operation 104 may include photo-patterning (i.e., applying photo-resist) to the secondary sub-gap material for the purpose of patterning the sub-gap precisely resulting in etching the secondary sub-gap material into a desired shape, for example etching the side walls of the secondary sub-gap. This may be done by broad beam ion milling, among other means.

At operation 106, a first layer of magnetic material (i.e., magnetic thin film) may be deposited. In one example, the first layer is applied to a thickness which is approximately equal to or slightly greater than the height of the secondary sub-gaps. The first layer of magnetic material may be applied by conventional techniques such as sputtering or plating or other conventional techniques. The first magnetic layer may then be planarized which leaves the top surface of the secondary sub-gap exposed and relatively smooth.

At operation 108, a second layer of magnetic material (i.e., magnetic thin film) is deposited on top of the first magnetic material layer and on top of the secondary sub-gap structures. The second layer of magnetic material may be applied by conventional techniques such as sputtering or plating or other conventional techniques.

The gaps are formed in the second layer of magnetic material, preferably defined on or proximate to the secondary sub-gap structures. The gap patterns of second magnetic layer may made or defined by subtractive etching methods such as a) focused Ion beam etching (for instance, as described in U.S. Pat. No. 6,269,533 entitled "Method Of Making A Patterned Magnetic Recording Head," the disclosure of which is hereby incorporated by reference herein in its entirety); b) broad beam ion milling; or c) wet chemical etching.

In another example, the gaps in the second layer of magnetic material can be formed or defined by plating the pattern up or sputtering down the pattern, such as by a) plating up the second magnetic layer around a predefined photo-resist gap pattern, and the photo-resist is removed after the plating operation; or b) sputtering the second magnetic layer down, over and around a predefined positive gap pattern and removing or lapping back the over-sputtered positive gap structure.

Hence, it can be seen that embodiments of the present invention may provide for more efficient heads and allow the fabrication of narrower gaps in the surface of the head. Features of the present invention can be incorporated in both write and read heads.

A head having one or more features of the present invention can be used to write or format servo tracks on a tape media. For instance, a head can be part of a tape formatting device that receives and formats tapes with servo tracks or other data. Tape formatting devices can be formed utilizing one or more features of the present invention.

A magnetic tape may be manufactured by a method utilizing one or more features of the present invention. In one example, servo information is written onto the magnetic tape using a servo head incorporating one or more features of the present invention. In one example, a method for formatting a tape media includes an operation of providing a head having a secondary sub gap having a shelf or mesa upon which a thin magnetic film carrying a recording gap feature or features is formed in the surface magnetic film head.

Embodiments of the present invention can be utilized with different data storage systems, and may be used with various different types of heads, including as examples but not limited to ferrite heads, thin film heads, Type I™ or Type II™ heads, or any other conventional head. For instance, the head may be a Type I™ head having a single ferrite channel, such as described in U.S. Pat. No. 5,689,384 entitled "Timing Based Servo System For Magnetic Tape Systems"; or a Type II™ head having multiple ferrite channels such as described in U.S. Pat. No. 6,496,328 entitled "Low Inductance, Ferrite Sub-Gap Substrate Structure For Surface Film Magnetic Recording Heads," the disclosures of which are both incorporated by reference in their entirety.

Embodiments of the present invention may be applied to an integrated thin film surface head, such as described co-pending, commonly assigned U.S. Patent Application No. 60/568,139 entitled "Arbitrary Pattern Thin Film Surface Film Head" filed May 4, 2004, the disclosure of which is hereby incorporated by reference in its entirety.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

It should be appreciated that reference throughout this specification to "one embodiment" or "an embodiment" or "one example" or "an example" or "another example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

While the invention has been particularly shown and described with reference to a preferred embodiment thereof, it will be understood by those skilled in the art that various other changes in the form and details may be made without departing from the spirit and scope of the invention.

What is claimed is:

1. A magnetic surface film head, comprising:
    a first sub-pole and a second sub-pole, each bordering a sub-gap region;
    a first magnetic thin film layer spanning the sub-gap region from the first sub-pole to the second sub-pole and having first and second secondary sub-gap structures proximate the sub-gap region; and
    a second magnetic thin film layer extending over the first secondary sub-gap structure and the second secondary sub-gap structure and having a first arbitrary gap feature positioned proximate the first secondary sub-gap structure and a second arbitrary gap feature positioned proximate the second secondary sub-gap structure, the first and second arbitrary gap features, in combination, forming a timing-based servo gap pattern;
    wherein the first magnetic thin film layer includes a portion spanning beneath the second magnetic thin film layer between the first and second secondary sub-gap structures.

2. The magnetic head of claim 1, wherein the secondary sub-gap structures are made of material including $SiO_2$.

3. The magnetic head of claim 1, wherein the secondary sub-gap structures are made of material including $Al_2O_3$.

4. The magnetic head of claim 1, wherein the first and second magnetic thin film layers combine to approximately 3 microns thick.

5. The magnetic head of claim 1, wherein the arbitrary gap features are between approximately 0.1 to 0.5 microns wide.

6. The magnetic head of claim 1, wherein the secondary sub-gap structures each include a pair of angled side walls and a top surface.

7. The magnetic head of claim 6, wherein the first and second arbitrary gap features are positioned on the top surfaces of the first and second secondary sub-gap structures, respectively.

8. A magnetic surface film head, comprising:
    a first sub-pole and a second sub-pole, each bordering a sub-gap region, the first sub-pole, the second sub-pole, and the sub-gap region forming a generally planar surface;
    a first generally planar magnetic thin film layer formed on the generally planar surface of the first sub-pole, the second sub-pole, and the sub-gap region and having a first secondary sub-gap structure and a second secondary sub-gap structure; and
    a second generally planar magnetic thin film layer extending over the first secondary sub-gap structure and the second secondary sub-gap structure and having a first arbitrary gap feature positioned proximate the first secondary sub-gap structure and a second arbitrary gap feature positioned proximate the second secondary sub-gap structure;
    wherein the first magnetic thin film layer includes a portion spanning beneath the second magnetic thin film layer between the first and second secondary sub-gap structures.

9. The magnetic head of claim 8, wherein the secondary sub-gap structures are made of material including $SiO_2$.

10. The magnetic head of claim 8, wherein the secondary sub-gap structures are made of material including $Al_2O_3$.

11. The magnetic head of claim 8, wherein the first and second magnetic thin film layers combine to approximately 3 microns thick.

12. The magnetic head of claim 8, wherein the arbitrary gap features are between approximately 0.1 to 0.5 microns wide.

13. The magnetic head of claim 8, wherein the secondary sub-gap structures each include a pair of angled side walls and a top surface.

14. The magnetic head of claim 13, wherein the first and second arbitrary gap features are positioned on the top surfaces of the first and second secondary sub-gap structures, respectively.

* * * * *